US012237487B2

(12) United States Patent
Wassmur et al.

(10) Patent No.: US 12,237,487 B2
(45) Date of Patent: Feb. 25, 2025

(54) RESILIENT BATTERY COOLING SYSTEMS AND METHODS

(71) Applicant: Polestar Performance AB, Gothenburg (SE)

(72) Inventors: Robert Wassmur, Gothenburg (SE); Jongseok Moon, Gothenburg (SE); Niklas Roos, Gothenburg (SE)

(73) Assignee: Polestar Performance AB, Gothenburg (SE)

( * ) Notice: Subject to any disclaimer, the term of this patent is extended or adjusted under 35 U.S.C. 154(b) by 0 days.

(21) Appl. No.: 17/454,717

(22) Filed: Nov. 12, 2021

(65) Prior Publication Data

US 2022/0149454 A1    May 12, 2022

Related U.S. Application Data

(60) Provisional application No. 63/198,783, filed on Nov. 12, 2020.

(51) Int. Cl.
| | |
|---|---|
| *H01M 10/625* | (2014.01) |
| *B60L 50/60* | (2019.01) |
| *H01M 10/613* | (2014.01) |
| *H01M 10/63* | (2014.01) |
| *H01M 10/663* | (2014.01) |
| *H02J 7/00* | (2006.01) |

(52) U.S. Cl.
CPC ........... *H01M 10/625* (2015.04); *B60L 50/66* (2019.02); *H01M 10/613* (2015.04); *H01M 10/63* (2015.04); *H01M 10/663* (2015.04); *H02J 7/0013* (2013.01); *H02J 7/0063* (2013.01); *H01M 2220/20* (2013.01)

(58) Field of Classification Search
CPC ............. H01M 10/625; H01M 10/613; H01M 10/663; H01M 2220/20; B60L 50/66; H02J 7/0013; H02J 7/0063
USPC ................................................... 307/10.1, 9.1
See application file for complete search history.

(56) References Cited

U.S. PATENT DOCUMENTS

| | | | |
|---|---|---|---|
| 2005/0242775 A1* | 11/2005 | Miyazaki | ................ B60L 58/21 320/116 |
| 2009/0284223 A1 | 11/2009 | Miyazaki et al. | |
| 2013/0033793 A1* | 2/2013 | Takeda | ................. G01R 31/396 361/91.1 |
| 2015/0280294 A1 | 10/2015 | Shin et al. | |
| 2017/0072851 A1 | 3/2017 | Shenoy et al. | |
| 2017/0214099 A1* | 7/2017 | Fleming | .............. H01M 10/635 |
| 2017/0259687 A1* | 9/2017 | Chikkannanavar | .......................... H02J 7/00308 |
| 2018/0209675 A1 | 7/2018 | Ridder | |
| 2018/0334118 A1* | 11/2018 | Masui | ........................ H02J 7/00 |
| 2019/0100111 A1* | 4/2019 | Liu | ........................ B60R 16/033 |
| 2020/0055404 A1* | 2/2020 | Conlon | ................... B60L 53/14 |

(Continued)

OTHER PUBLICATIONS

Application No. PCT/US2021/072381, International Search Report and Written Opinion, Mailed on Apr. 18, 2022, 14 pages.

*Primary Examiner* — Rexford N Barnie
*Assistant Examiner* — Swarna N Chowdhuri
(74) *Attorney, Agent, or Firm* — Kilpatrick Townsend & Stockton LLP

(57) ABSTRACT

Systems and methods of thermal control in a resilient battery cooling system ensure that power is maintained to operate a cooler even when an event disables a battery cell. The cooler can therefore prevent thermal propagation from the affected cell to neighboring cells.

18 Claims, 7 Drawing Sheets

(56) References Cited

U.S. PATENT DOCUMENTS

| | | | |
|---|---|---|---|
| 2020/0212512 A1* | 7/2020 | Kwon | H01M 10/486 |
| 2021/0206275 A1* | 7/2021 | Mahmoud | F02N 11/0866 |
| 2022/0089030 A1* | 3/2022 | Norberg | H02J 7/0063 |
| 2022/0212655 A1* | 7/2022 | Johnson | F16H 59/44 |
| 2022/0367992 A1* | 11/2022 | Lee | H02J 7/0063 |

* cited by examiner

RESILIENT BATTERY COOLING SYSTEMS AND METHODS

RELATED APPLICATION INFORMATION

This application claims the benefit of U.S. Provisional Application No. 63/198,783, filed Nov. 12, 2020, the contents of which are fully incorporated herein by reference.

TECHNICAL FIELD

Embodiments described herein include arrangements for monitoring or controlling batteries, including those adapted for electric vehicles. Systems and methods described herein can be used to provide redundant power supply to high voltage components.

BACKGROUND

Hybrid and electric vehicles are becoming increasingly popular as consumers look to decrease their environmental impact and improve air quality. Instead of a traditional internal combustion engine, hybrid and electric vehicles include one or more electrical motors that are powered by a rechargeable battery pack. Most rechargeable battery packs are made up of one or more battery modules, each module containing a plurality of battery cells. Based on power requirements and consumer demand, rechargeable battery packs have tended towards higher operating voltages. For example, based on Ohm's law (e.g., $P=V2/R$), doubling the voltage of the rechargeable battery pack approximately quadruples the power output (assuming a similar resistance of the one or more motors). Accordingly, whereas battery packs for electric vehicles traditionally tended to be in the 200-400 V range, newer electric vehicles may include high-voltage battery systems with outputs much higher, such as around 800 V, so that a motor having equivalent internal resistance will output much higher power levels.

Within a hybrid or electric vehicle, a power supply may be modified by an electrical distribution system to deliver the appropriate voltage to each component. Such vehicles have conventionally included two separate battery subsystems. The first of these is intended for operating the drivetrain, sometimes referred to as a "traction battery," and is configured to produce a high voltage (typically at least several hundred volts). The second battery is then configured for operating cabin accessories, climate control, and in the case of hybrid vehicles, the starter for the internal combustion engine. The second battery subsystem produces an output that is at a significantly lower voltage level than the first battery; for example, the second battery may be operated at between about 5V and about 20V while the first battery subsystem may be operated at several hundred to a few thousand volts in a typical case.

As a result of this division of responsibilities between high-voltage and low-voltage batteries, the failure of either system results in inoperability of the entire vehicle. That is, if the low-voltage battery is inoperable the vehicle's peripherals (and possibly starter) will fail, while if the high-voltage battery is inoperable then the vehicle's traction system will be affected or lost.

Moreover, in rare circumstances, a runaway chemical reaction within a damaged battery cell of the high-voltage systems can cause the cell to overheat. In extreme circumstances, the propagation of heat from the cell experiencing a thermal event can transfer to adjacent cells thereby raising the temperature of the adjacent cells, resulting in propagation of the thermal event throughout the battery pack (sometimes referred to as a "thermal runaway"), potentially consuming the entire electric vehicle. In these circumstances, it is important to consider the availability of the accessories operating at all voltage levels, and what effects each of them going offline could have.

It would be desirable to provide power to an electric or hybrid vehicle that maintains power for all essential functions. Maintaining these functions in adverse conditions, such as during a crash or battery failure, is of particular importance

SUMMARY

Embodiments described herein resolve the deficiencies of conventional systems by using two electrically isolated high-voltage power strings, each of which powers the electrical distribution system. Furthermore, systems and vehicles described herein include componentry that is capable of operating at either medium or high voltage, such that even if not all of the battery strings remain online, essential functions for cooling the battery and preventing injury or damage to the vehicle or its occupants are maintained.

During normal operation, the electrical distribution system combines the voltages of the two high-voltage strings and delivers the combined voltage to the traction system. The electrical distribution system can further step down the voltage from the two strings to power other features of the vehicle, including climate control, battery cooling, cabin controls, etc.

In the event of a thermal event, mechanical damage to a battery string, wiring failure, or other event that disables one or more cells within a string, power from the other string can still be used by the electrical distribution system to operate the low- and medium-voltage systems.

For example, in one embodiment an 800V combined output can be generated by two 400V battery strings. When one of these strings is not functional, then the other string still provides 400V of output that. A compressor for a cooler system that chills the battery strings can be operated at either of the 800V level or the 400V level, and the strings are electrically connected to provide 400V power when either string is still active.

It should be understood that these values are provided as an example only, and that any number of strings could be combined to form the high-voltage output. For example, an electric motor that operates at 900V could receive power in series from three 300V strings, or other combinations of voltages and number of strings could be used. In embodiments, the strings may not even be identically sized. An 800V high voltage output can easily be provided by one 400V string and two 200V strings, for example. So long as the cooler is operable at the lower voltage level provided by individual strings, even when the combined voltage of all the strings is unavailable, the result will be the same.

A power supply system as described herein can include a condenser coupled to a junction box, and the compressor can be configured to operate at either of the first voltage corresponding to a first battery string, the second voltage corresponding to a second battery string, or the sum of the first voltage and the second voltage. The condenser can create a cooled fluid. The system (or a vehicle in which the system is arranged) can include a plurality of valves and pipes, wherein the plurality of valves and pipes are configured to selectively deliver the cooled fluid to the first battery string, the second battery string, and the drive system. A vehicle comprising the power supply system need not have a separate low-voltage battery or system.

According to another embodiment, a method for supplying a low-voltage direct current output from at a high-voltage battery system includes providing a first power output from a first battery string configured to provide power at a first voltage; providing a second power output from a second battery string configured to provide power at a second voltage; providing a transformer coupled to both the first battery string and the second battery string, wherein the transformer receives power at the first voltage from the first battery string and also receives power at the second voltage from the second battery string; providing a drive system; and providing a relay configured to selectively couple the first battery string and the second battery string to deliver power to the drive system at a voltage equal to the sum of the first voltage and the second voltage.

DETAILED DESCRIPTION OF THE DRAWINGS

Figure 1:
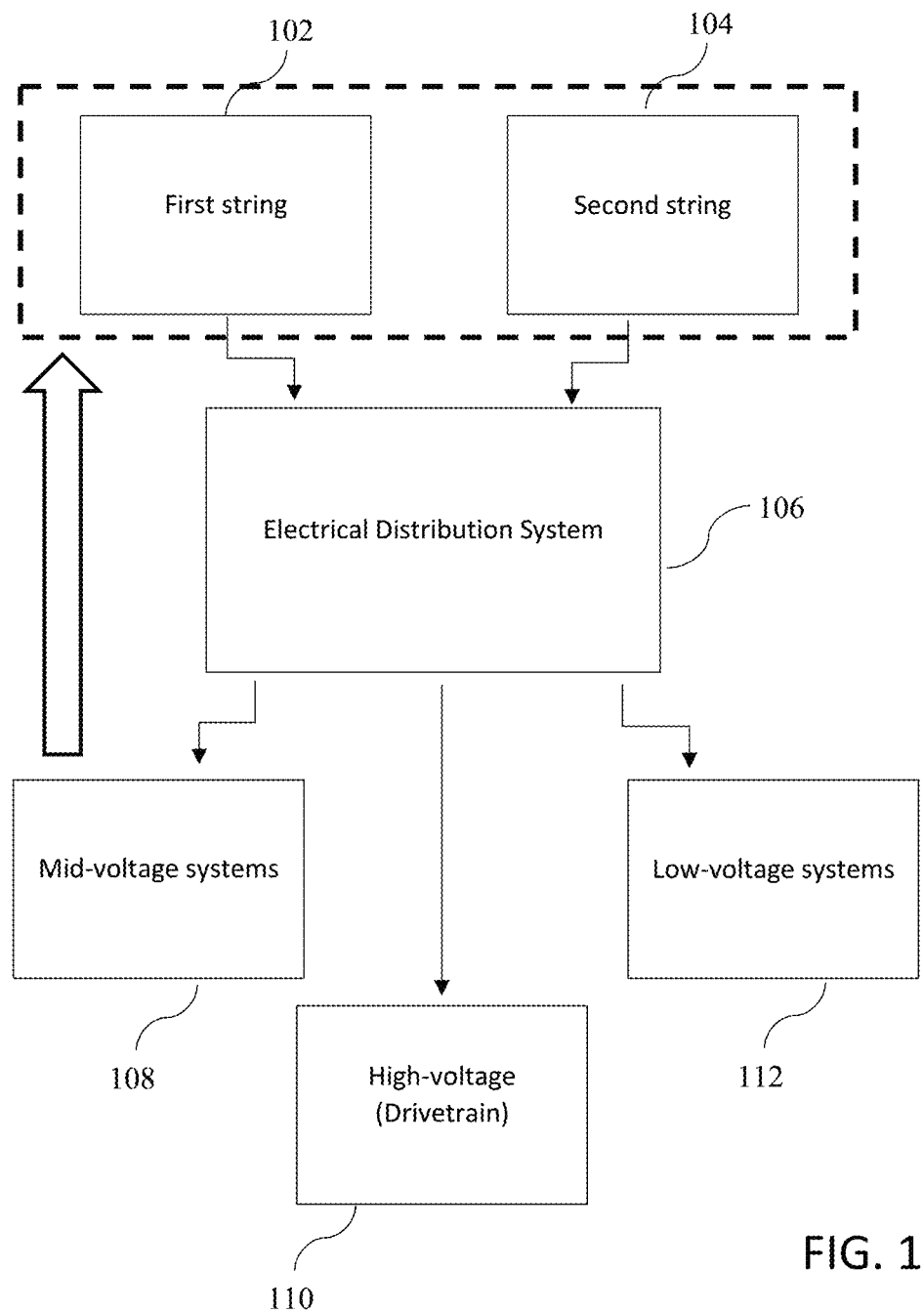
FIG. 1 is a schematic of a power and thermal management system according to an embodiment.

As described herein, power management and thermal management are accomplished in a way that prevents thermal propagation of battery events using a two-string battery system.

In high-voltage power systems, individual battery cells are arranged in serial to increase the total voltage of the string. Failure of a single cell within the string can therefore disable the high-voltage system. Additionally, failure of a cell can spread to others, due to thermal propagation. One type of cell failure, a thermal runaway event, could therefore disable the cooler, which is the very feature that could help slow or even prevent the runaway event from spreading to adjacent cells.

Some countries, to ensure safety of electrical vehicles, require demonstration that the high-voltage system is sufficiently protected from thermal propagation of battery failures from one cell to others. Thermal propagation can be prevented by providing adequate cooling, but in a single-source, high-voltage vehicle, cooling power supply could be put offline by a single battery cell's failure. Therefore maintaining function of the cooler is both critical and also easily taken offline.

Throughout this application, some terms are used to refer to voltage levels that are consistent with present-day electric vehicles.

For example, "low voltage" is used to refer to the voltage levels typically used to power accessories like speakers, console displays, door locks, window motors, defroster wires, fans, seat heaters, wired and wireless rechargers and outlets, and the like. "Low voltage," as used throughout this application, typically refers to anything at or under 230V (i.e., European standard operating voltage), but more at 12V (standard accessory operating bus voltage) or even 5V (used for systems such as phone chargers and other similarly-sized electronics).

Likewise, "mid-range voltage" refers to voltage in the range typically used for propulsion in existing electrical vehicles. "Mid-range voltage" refers to power levels that are usable for propulsion, and may have been in some modern vehicles, but which are below high voltage levels (see below). Mid-range voltage can be, for example, 202V (used in drivetrains for hybrid vehicles such as the Toyota Prius), 375V (used in modern all-electric drivetrains such as the Tesla Model S and Model 3), 389V (used in the Jaguar I-Pace) or other voltages in this range.

Finally, "high voltage" refers to the voltage levels that are beginning to be used in modern all-electric drivetrains. These vastly exceed the mid-range voltages, recognizing that the power output of the same electric motor increases substantially exponentially with increased input voltage. Such high voltage systems are used in next-generation vehicles produced by the applicant, Polestar.

Generally speaking, for the purposes of this application and subject to the details above, it can be assumed that "low voltage" is equal to or less than 200V, "mid-range voltage" refers to voltages above 200V and below 400V, and "high voltage" refers to voltages at or above 400V. However, it should be understood that in future the operating voltages of electrical vehicles may increase. This is due to the expected increases in nominal power output and energy storage within battery packs, as well as the incentive to increase operating voltage described above for purposes of power output. Therefore it is fully expected that in future, "high voltage" in the electrical vehicle context could reach much higher, such as thousands of volts, and "mid-range voltages" would still refer to the entire range of voltages between those high-voltage values used for propulsion and the low-voltage values used for accessories like door locks and window motors. The principles described within this application apply equally as typically-used voltage ranges vary, as they are expected to over time.

Throughout this application, ranges such as the voltages above are described as being "about," "substantially," or "approximately" equal to a certain value. It should be understood that battery power output and voltage varies according to understood design tolerances and are not exact. Furthermore, the voltages or power output of a particular battery system can be subject to change with a variety of different conditions, such as the state of charge, the battery temperature, load level (either existing or historical), wear and tear or age of the battery, resistance of connecting electrical components and conductors, etc. When a level is referred to as "about," "substantially," or "approximately" equal to a certain value it is meant that the value is the nominal one, subject to such normal variations.

As shown in FIG. 1, a first string of cells 102 and a second string of cells 104 each provide power to an electrical distribution system 106. Electrical distribution system 106 can provide power to mid-voltage loads 108, high voltage loads such as a drivetrain 110, and low-voltage systems 112.

During normal operation, drivetrain 110 receives power from both first string 102 and second string 104 that is routed through electrical distribution system 106. In embodiments, electrical distribution system 106 can combine the voltages of the first string 102 and the second string 104 to provide a higher voltage to the drivetrain 110. For example, in one embodiment the first string 102 and the second string 104 can each provide 400V power output, and drivetrain 110 receives 800V power supplied by the electrical distribution system 106. It should be understood that in other embodiments the electrical distribution system 106 could provide some other voltage to the drivetrain, and the two strings 102 and 104 may not necessarily have identical voltage outputs.

First string 102 and second string 104 each generate some level of heat during charging and discharging. In rare circumstances, such as runaway thermal degradation, mechanical impact, or other unexpected failures, one or more cells within either first string 102 or second string 104 may begin to increase in temperature. Each string (102, 104) contains thermal shielding between the cells therein, but it may still be possible for the failure to spread if sufficient heat is provided from one cell to its neighbor.

One type of mid-voltage load 108 can be a cooler. In embodiments, a cooler can be provided that is capable of operation at high voltage (e.g., 800V) and at mid-voltage (e.g., 400V) such that when one string is disabled, the other may continue to adequately power the cooler.

Cooler 108 prevents such thermal propagation, or at least offsets it enough that the neighboring cells do not fail. Because cooler 108 is coupled to electrical distribution system 106 that is powered by both first string 102 and second string 104, the failure of a cell in either string does not disable cooler 108. In the example where each of the first string 102 and second string 104 provides 400V of power, cooler 108 can be configured to operate at 400V, such that electrical distribution system 106 can easily route appropriate power to cooler 108 to continue operation based on the power provided by the string that has not experienced a failure.

It should be understood that cooler 108 need not operate at exactly the same voltage as the individual strings 102. Electrical distribution system 106 may include step-up or step-down transformers to provide appropriate voltage to cooler 108. In such embodiments, the power provided by either string 102 or 104 is capable of being manipulated to drive cooler 108 even where the other string is disabled. The voltage level can be set at electrical distribution system 106 or it can be a result of the interconnections between the cells and strings of the battery system. For example, four 200V strings of cells can be arranged to provide 400V by connecting two pairs of strings in series, and then coupling those pairs in parallel.

In embodiments, battery contactors can be opened during some events such as a collision that could impact the battery integrity. These contactors can be reopened based on actual location of damage, if any. The unaffected string or strings can be reconnected to cool the entire system, avoiding thermal propagation if one part of the battery has been damaged.

In embodiments, cooler 108 can use the same compressor as the climate control system for the cabin of a vehicle, or in other embodiments the cooler 108 can be separate from any climate control systems.

It will be understood, therefore, that these two interrelated features provide a beneficial effect when combined. A cooler capable of being operated as either a high-voltage load or a mid-voltage load, in combination with a split-string battery system, can prevent thermal runaway events that would otherwise not be addressed.

Figure 2:
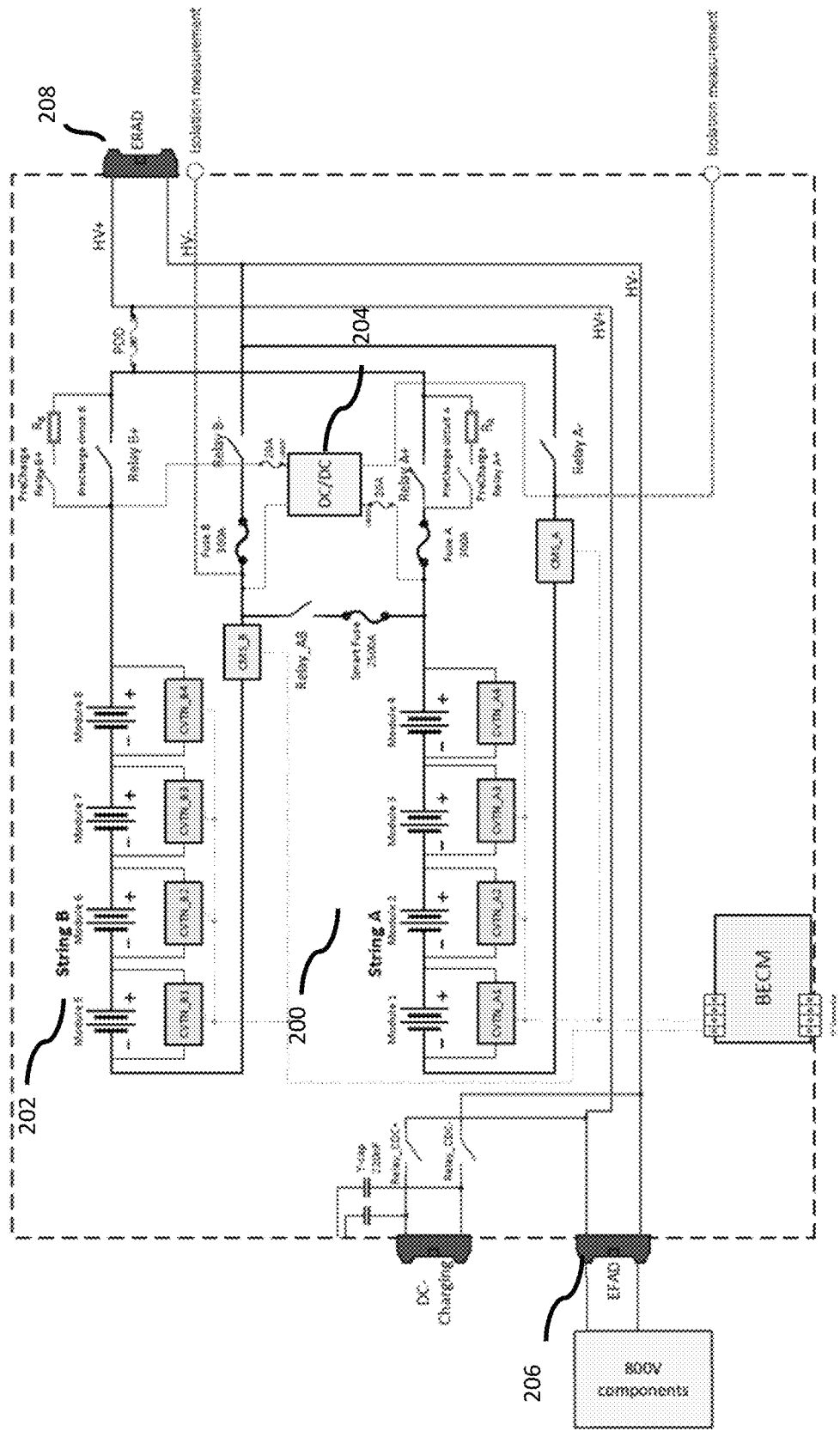
FIG. 2 is a schematic diagram depicting a high-voltage battery system for electric vehicle comprising redundant low-voltage vehicle accessory power supplies, in accordance with an embodiment of the disclosure.

FIG. 2 shows an example schematic of a battery and electrification scheme, according to an embodiment. FIG. 2 shows a first battery string 100, a second battery string 102, each of which includes four modules (depicted with the conventional symbol for a voltage supply) arranged in series. In modern battery architecture, each of the four modules could be 100V, for example, such that the first battery string 100 and the second battery string 102 each have a net voltage of approximately 400V. However, in alternative embodiments each module could have a different voltage, or a different number of modules could be used in each of the first battery string 100 and the second battery string 102 to result in a different net output voltage.

FIG. 2 shows a first string 200 and a second string 202, and also shows DC/DC transformer 204. The DC/DC transformer 204 can be used to create low-voltage output. The DC/DC transformer 204 can be powered to produce a 12V output, for example. Further details of DC/DC transformer 204 and other components of FIG. 2 can be found in co-pending application PCT/US21/71590, filed 24 Sep. 2021, the contents of which are incorporated herein by reference in their entirety.

FIG. 2 also shows an electric front axle drive (EFAD) 206 and an electronic rear axle drive (ERAD) 208. Each of the EFAD and ERAD are for propulsion purposes. That is, power can be routed to the front of a vehicle and the back of the vehicle at EFAD 206 and ERAD 208, respectively, to be used to move the vehicle. In 2-wheel drive vehicles, either of the EFAD 206 or the ERAD 208 may be omitted. The EFAD 206 and ERAD 208 are configured to operate at high voltage. In the example above where each module operates at 100V, the EFAD 206 and ERAD 208 can operate at 800V.

In other embodiments where there are more modules, more battery strings, or higher voltages within each module, the EFAD 206 and ERAD 208 can operate at even higher voltages corresponding to the sum of the operating voltage of each module. For reasons that will become clear below, it may be desirable for EFAD 206 and ERAD 208 to each be capable of providing propulsion even when a lower voltage is received. That is, EFAD 206 and/or ERAD 208 can be configured to operate even if only powered by first battery string 200 alone, or only if powered by second battery string 202 alone. In the example above, that is, EFAD 206 and ERAD 208 would each be capable of driving vehicle propulsion at 400V.

For clarity, the electric motors of the vehicle are not shown in FIG. 2. However, it should be understood that EFAD 206 can be coupled to one electric motor (driving all front wheels) or it could serve as a power bus that routes power to each of several drive wheels at the front of the vehicle. Likewise, ERAD 208 could be coupled to one rear motor or could route power to a number of rear wheels. In passenger vehicles, the number of drive wheels at the front of the vehicle by EFAD 206 will typically be two, and the number of drive wheels at the back served by ERAD 208 will also be two. However, the concepts described herein are not so narrow as to be limited to such embodiments. It should be understood that in tricycle embodiments, EFAD 206 could serve a single front wheel while ERAD 208 could serve a pair of rear wheels. On the other hand, for cargo trucks or articulated buses, there could be significantly more than four total drive wheels. The number of EFAD and ERAD connections in such embodiments will vary based on the vehicle geometry. For example, an 18-wheel tractor trailer for long-distance driving may benefit from having nine connections to power distribution buses like EFAD 206 and ERAD 208.

Each of the first battery string 200 and the second battery string 202 is separately electrically coupled to DC/DC transformer 204. Likewise, each of the first battery string 200 and the second battery string 202 is electrically coupled to the EFAD 206 and other 800V components, as well as the ERAD 208. In sum, each of the DC/DC transformer 204, the EFAD 206, the ERAD 208, and the high-voltage components 210 are coupled to both of the battery strings 200 and 202. One notable difference, however, is that the DC/DC transformer 204 receives power from both strings at separate inputs, whereas the other components 206, 208, and 210 receive power from both battery strings 200 and 202 at a common input. Because of the manner in which the connections are made, the voltage at the EFAD 206 and the ERAD 208 is substantially equal to the sum of the output voltages of the strings (200, 202).

Figure 3:
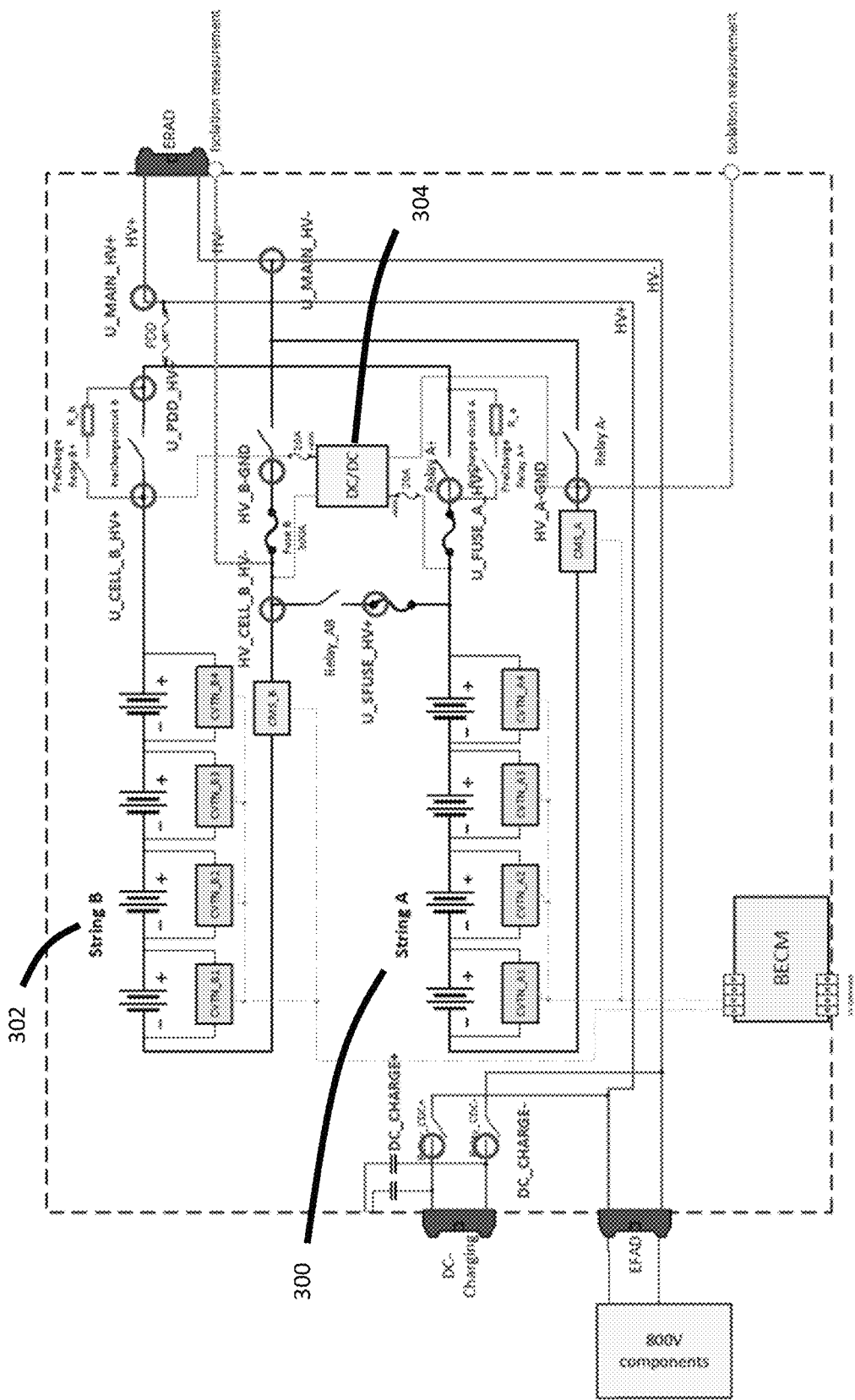
FIG. 3 is a schematic diagram of an electrical distribution system according to an embodiment.

Throughout FIG. 3 and the rest of this document, like components are depicted in the drawings having like reference numbers iterated by a factor of 100.

As shown in FIG. 3, during use the positive outputs from first battery string 300 can be coupled to the negative pole of second battery string 302 with the switch labeled HV_B-GND and the switch labeled HV_A-GND open. That is, the point labeled U_MAIN_HV+ will be at a voltage difference from the point labeled U_MAIN_HV− by the net voltages of all the modules within the first and second battery strings 300 and 302.

Otherwise, if one cell should be disconnected from operation due to a failure or abnormal operation, Relay_AB can be opened (or, causing the same effect, the fuse U_SFUSE_HV+ may be blown) and the switches corresponding to the remaining operable string can be closed. That is, if first string 300 is still operational as determined by an isolation measurement, Relay A− and Relay A+ may be closed while Relay_AB is open, for example.

It should be understood that the same applies in reverse to charging: when DC_CHARGE+ and DC_CHARGE− are receiving power, the corresponding switches are closed and can charge both strings (with Relay_AB closed) or a single string (with Relay_AB open and the switches corresponding to just one string closed).

There may be benefits to charging one string at a time. For example, charging one string at a time can help to balance a charge level between the two strings. In other contexts, one string may be too warm or too cold to safely receive DC charging. DC charging can also be routed to components such as a battery cooler or heater (at the module marked 800V components) either independently, or while charging one or both of the battery strings 300, 302.

Other benefits of such a system can include:
Maintaining autonomous drive at 400V when one battery string is offline;
Selective power distribution to vehicle systems during a power failure event (e.g., safety systems first, battery cooling second, autonomous drive third, accessories last);
Compensating for an event that would otherwise put a separated 12V system offline (e.g., during rear-end collision where 12V batteries are often housed), including selective power distribution when limited 12V power siphoned off the 400V or 800V system is available;
Using a solar panel or other low-current feature to balance battery string charge levels over a longer duration; and
Wall-to-grid power applications, or electronic storage systems, that benefit from multi-string architectures.

The first two items in this list are made possible by using components, referred to herein as hybrid loads, that can operate at either high voltage or at middle voltage, such that when one battery string is offline those components can still function. That is, when one battery string includes a cell undergoing a thermal event, the other battery string can maintain cooler function to prevent the event from propagating. Likewise, if a vehicle in autonomous drive mode has a power failure for any reason in one string, the ADAS is a hybrid load that can still manage to pull over, send a distress signal, avoid obstacles, and the like to maintain passenger safety.

Figure 4:
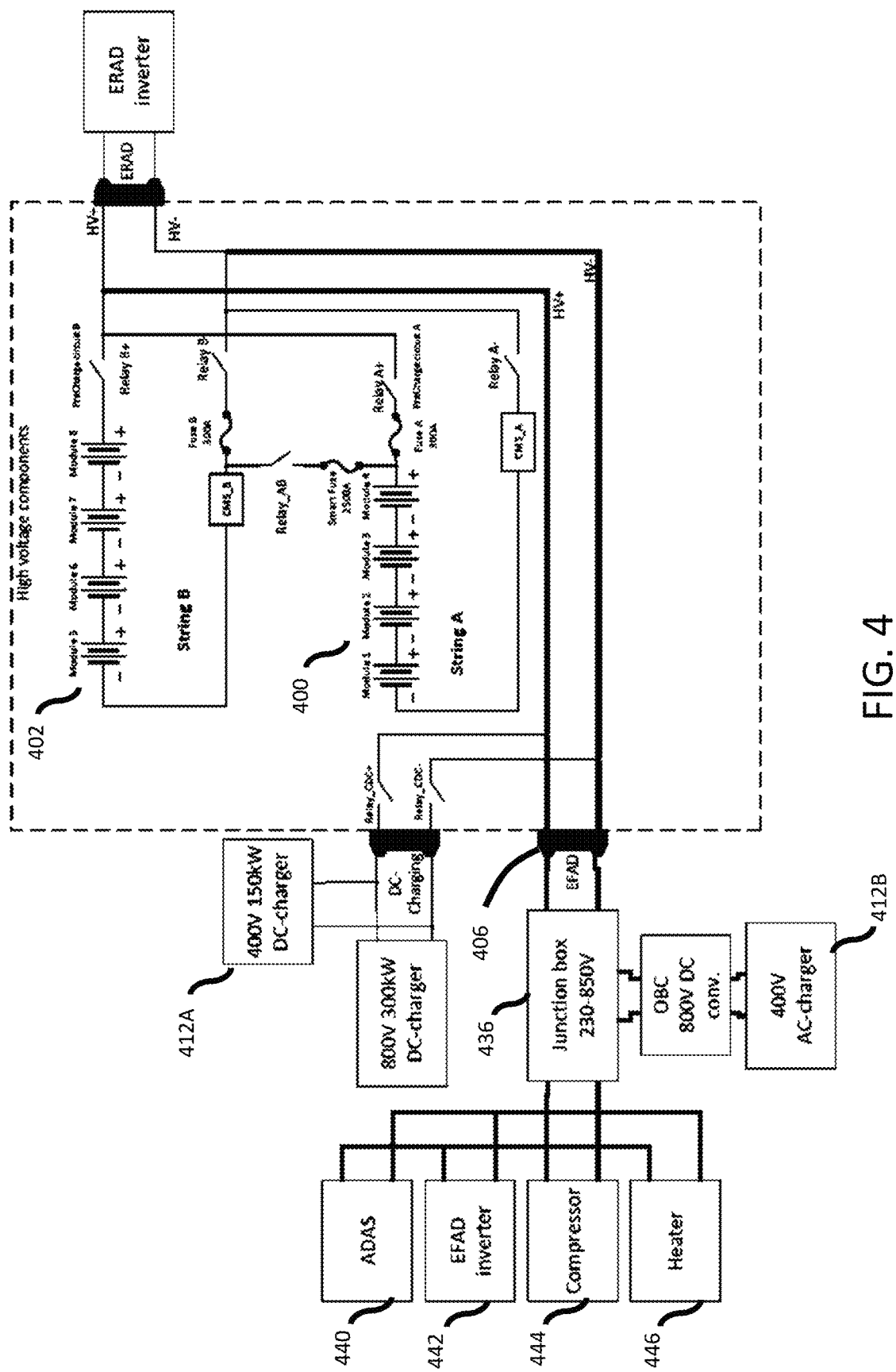
FIG. 4 is a schematic diagram of an electrical distribution system depicting a series of hybrid loads, according to an embodiment.

FIG. 4 shows a schematic view of a system similar to those previously described with respect to FIGS. 1-3, but with more detail shown for the high-voltage components that can be coupled to the EFAD 406. For simplification of the drawings and clarity, other components including the DC/DC transformer system described earlier have been omitted from this view.

FIG. 4 demonstrates two possible charging mechanisms. The first is AC charger 412A, which is shown as a 400V AC charging system. It should be understood that depending on the type of power supply, the AC power could be delivered at a variety of frequencies and voltages, which are converted prior to being delivered to junction box 436. The second power supply, DC power supply 412B, routes power to the EFAD 406 as described in previous drawings, which then routes power to junction box 436.

As shown in FIG. 4, junction box 436 is a general distribution bus capable of delivering power within a range from 230-850V in a vehicle having 800V of total battery module output. That is, junction box 436 is capable of delivering power at the middle-range voltages and at high voltage ranges. Junction box 436 is coupled to loads 440-446 that each consume power within this range.

Advanced driver-assistance systems (ADAS) 440 can include many things, including sensors, actuators, processors, and other subsystems configured to maintain a vehicle within its lane, at proper speed, driving safely. In embodiments, ADAS 440 can be coupled to EFAD converter 442, which powers the drivetrain itself. Compressor 444 can be used for multiple purposes, including climate control (that is, air conditioning) as well as cooling a fluid that is used to maintain battery temperature within a desired range. In embodiments, multiple compressors 444 can be powered from junction box 436, to separate these functions, while in other embodiments a single compressor can perform both functions. Likewise, heater 446 can be either used for cabin heat or for battery (or other mechanical component) heating, or in embodiments a single heater can be used for both functions.

In embodiments, elements that are powered by junction box 436 can be operable at the full, high-voltage output level from the combined battery strings, or they can be operable at the voltage from a single string. In some cases, components powered by junction box 436 can operate at either voltage.

According to one embodiment, compressor 444 is configured to cool both battery strings 400 and 402. In the event of damage to one battery string (400 or 402), such as due to a runaway thermal event or a collision, heat can begin to buildup in the damaged cells. It is well-established that this reaction will continue if left unchecked, with additional heating causing additional breakdown of the battery until, if left unchecked the battery cells can combust. For this reason, electric vehicles include a number of safeguards including thermal shielding, venting, and monitoring. These safeguards, however, take up volume and weight in the battery tray that reduces vehicle range. As battery capacity increases, the capacity for thermal runaway and the amount of power dissipated during such an event increases, such that more and more shielding and monitoring is required.

However, it is also known that with cooling, such runaway events will not propagate to adjacent cells, and in some cases can be halted altogether. Notably, in this embodiment compressor 444 has redundant power supply and can operate from either supply independently. That is, if first battery string 400 is damaged and a thermal event begins, the second battery string 402 still provides power to the EFAD 406, which in turn powers junction box 436 to drive compressor 444, and compressor 444 chills the cells within the damaged first battery string 400.

Contrariwise, if the second battery string 402 is damaged and a thermal event begins therein, the first battery string 400 still provides power to the EFAD 406, which in turn powers junction box 436 to drive compressor 444, and compressor 444 chills the cells within the damaged second battery string 402.

In sum, separating the battery into two strings provides redundant power at least in the mid-voltage ranges, and a compressor that is operable within such mid-voltage ranges is sufficient to prevent thermal runaway events without requiring ever more bulky and inefficient spacing between cells and modules.

Figure 5:
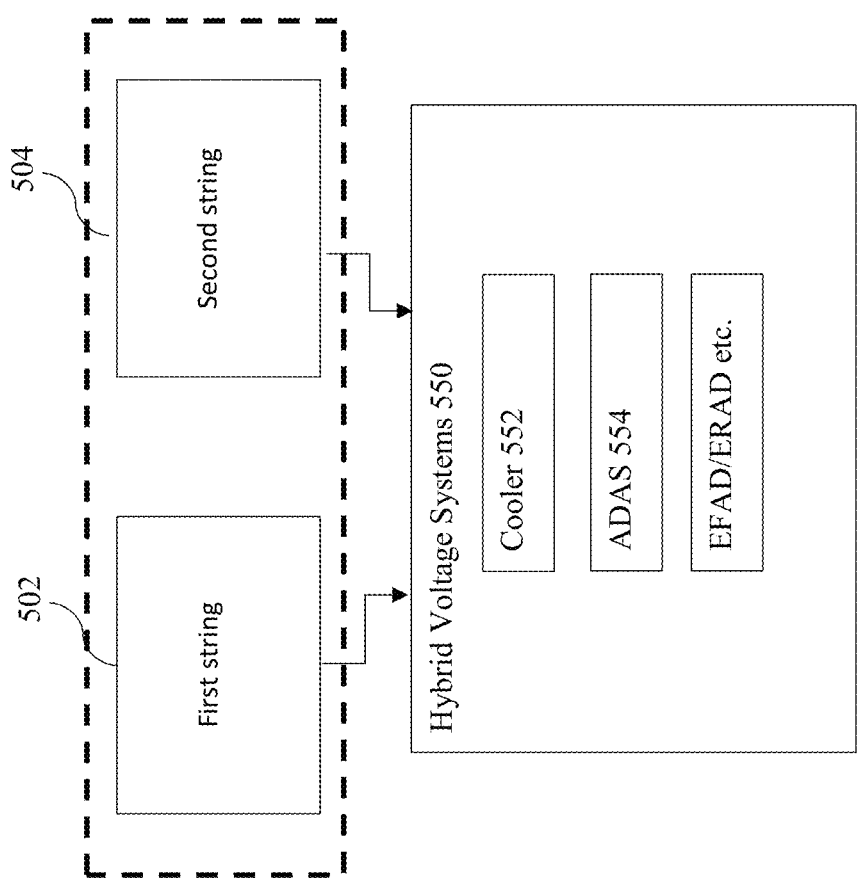
FIG. 5 is a schematic diagram of an electrical distribution system according to an embodiment.

FIG. 5 is a simplified schematic view showing power delivery from first string 502 and second string 504 of a battery system to a hybrid voltage system 550. The hybrid voltage system, which in practice can be either centralized or can be a set of distributed systems, includes the cooler 552, ADAS 554, and other components such as the EFAD and ERAD. These components share a common attribute in that they can be operated at either high voltage or at medium voltage. While medium voltage drive may provide less functionality than high voltage, there is nonetheless enough power to maintain essential function.

Essential function could include, as described above, cooling function to maintain battery temperature even when one cell or a set of cells in a string is undergoing a failure. Essential function could also include, for example, enough power to the ADAS 554 to bring the vehicle to a safe stop after an incident that puts at least one battery string out of operation.

Figure 6:
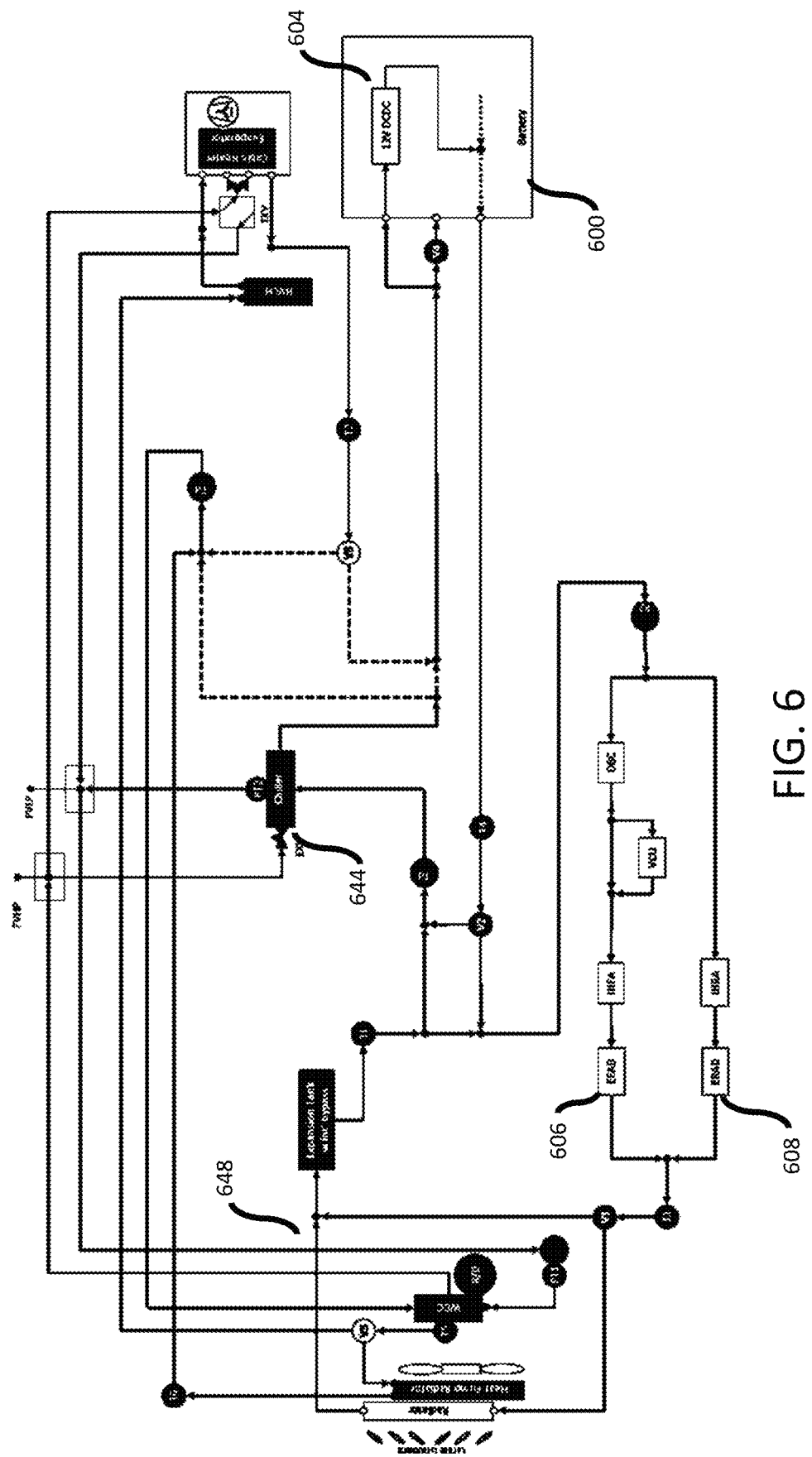
FIG. 6 depicts a flow diagram for a cooler system according to an embodiment.

FIG. 6 shows a simplified schematic view of a system of valves and pipes that couple the chiller or compressor 644 to a variety of components within the vehicle, which includes both the battery 600 (which it should be understood could include a number of battery strings) and DC/DC converter 604, as well as the EFAD 606 and ERAD 608 and other components. As shown in FIG. 6, it is possible by opening or closing appropriate valves to turn off cooling to some portions of the vehicle while leaving it on for others. For example in the embodiment shown in FIG. 6 it may be desirable after a collision (or after stopping the vehicle in the event of some other cell damage) to turn off cooling to EFAD 606 and ERAD 608 in the loop shown at the bottom of the page. During that time, however, fluid flow could remain between the chiller or compressor 644 and a radiator section 648 of the vehicle for heat exchange, as well as to the section on the bottom-right of the page that includes the battery 600 and the DC/DC transformer 604.

By cutting cooling to loops (such as the bottom loop having the EFAD 606 and ERAD 608) the amount of cooling and fluid flow delivered to the remaining sections can be maintained even in the event that the compressor 644 is operating with reduced voltage. That is, if the compressor is nominally designed to operate at 800V but is receiving only 400V due to a damaged battery string, it may still operate at reduced capacity. But even with this reduced capacity, by selectively operating the valves shown in FIG. 6 it is possible to route sufficient cooling fluid flow to the battery 600 to stop or delay any thermal event so that people in or near the vehicle can remain safe.

Figure 7:
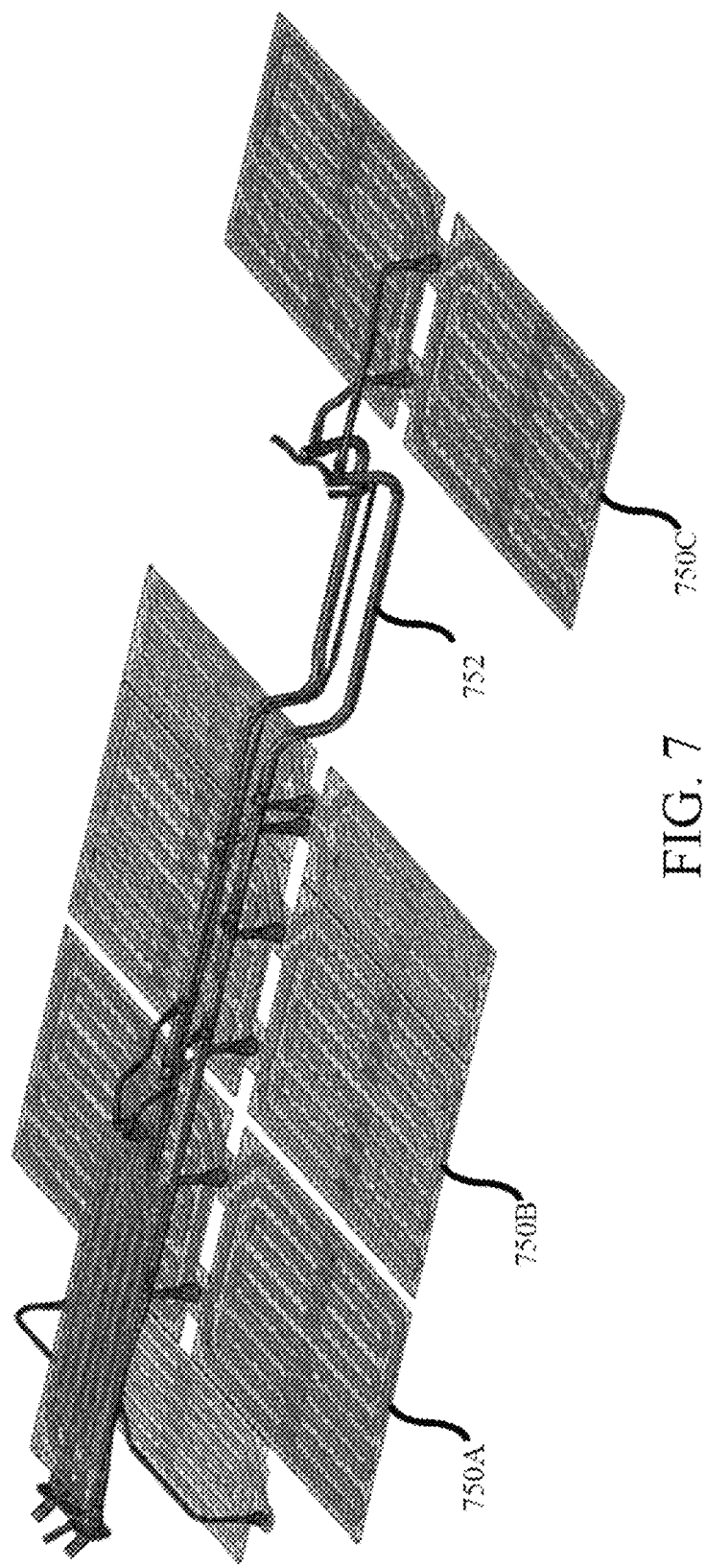
FIG. 7 depicts a cooling system for a vehicle battery according to an embodiment.

It should be understood that cooling could be done modularly, as shown in FIG. 7, using even more complex systems of valves. FIG. 7 shows only the cooling flow map for a battery tray having several cooling panels 750A-750C coupled to a central supply pipe system 752. In embodiments, sensors (which could be thermal sensors, pressure sensors, outgassing sensors, or electrical sensors in various embodiments) detect an area that is in need of additional cooling and increase the supply of cooling fluid to the corresponding cooling panel (750A-750C). By selectively cooling panels, the amount of cooling that needs to be delivered from the chiller (e.g., compressor 644 of FIG. 6) can be reduced even further.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

CLAUSES

1. An electrical distribution system comprising:
   a first battery string having a first operating voltage;
   a second battery string having a second operating voltage, the second battery string being electrically coupled to the first battery string to generate a total output voltage substantially equal to or greater than the sum of the first operating voltage and the second operating voltage; and
   a hybrid load configured to operate at any of the first operating voltage, the second operating voltage, or the total output voltage.

2. The electrical distribution system of claim 1, wherein the hybrid load is an ADAS.

3. The electrical distribution system of claim 1, wherein the hybrid load is a cooler.

4. The electrical distribution system of claim 1, wherein the first operating voltage is substantially equal to the second operating voltage.

5. The electrical distribution system of claim 1, wherein the total output voltage is equal to the sum of the first operating voltage and the second operating voltage.

6. The electrical distribution system of claim 1, wherein the total operating voltage is equal to the sum of the first operating voltage, the second operating voltage, and a third voltage corresponding to a third battery string.

7. The electrical distribution system of claim 1, wherein the electrical distribution system comprises a plurality of hybrid loads.

8. A method of operating an electrical system for a vehicle, the method comprising:
   providing a first battery string having a first operating voltage; providing a second battery string having a second operating voltage, the second
   battery string being electrically coupled to the first battery string to generate a total output voltage substantially equal to or greater than the sum of the first operating voltage and the second operating voltage; and
   providing a hybrid load configured to operate at any of the first operating voltage, the second operating voltage, or the total output voltage.

9. The method of claim 8, further comprising providing a cooling system having a plurality of cooling pathways, and wherein the hybrid load is a chiller.

10. The method of claim 8 or 9, further comprising selectively coupling the first operating voltage, the second operating voltage, or the total operating voltage to the hybrid load.

11. The method of claim 10 when dependent upon claim 9, further comprising selectively routing a coolant through the plurality of cooling pathways.

12. The method of claim 11, wherein the selective routing of the coolant comprises routing coolant adjacent to either the first battery string or the second battery string.

13. The method of claim 12, wherein the selective routing of the coolant is based upon the location of a detected thermal event in either of the first battery string or the second battery string.

14. A vehicle system comprising:
   a battery system including:
   a first battery string having a first operating voltage; and
   a second battery string having a second operating voltage, the second battery string being electrically coupled to the first battery string to generate a total output voltage substantially equal to or greater than the sum of the first operating voltage and the second operating voltage;
   a plurality of hybrid loads each configured to operate at any of the first operating voltage, the second operating voltage, or the total output voltage; and
   a cooling system comprising a plurality of coolant tubes and a chiller, and wherein the chiller is a hybrid load.

15. The vehicle system of claim 14, wherein one of the plurality of hybrid loads is an ADAS.

16. The vehicle system of either of claim 14 or 15, wherein the first operating voltage is substantially equal to the second operating voltage.

17. The vehicle system of either of claim 14 or 15, wherein the total output voltage is equal to the sum of the first operating voltage and the second operating voltage.

18. The vehicle system of either of claim 14 or 15, wherein the total operating voltage is equal to the sum of the first operating voltage, the second operating voltage, and a third voltage corresponding to a third battery string.

We claim:

1. An electrical distribution system comprising:
   a first battery string having a first operating voltage;
   a second battery string having a second operating voltage, the second battery string being electrically coupled in series to the first battery string to generate a total output voltage substantially equal to or greater than a sum of the first operating voltage and the second operating voltage; and
   a hybrid load configured to be operable at a nominal voltage and at a reduced voltage, wherein the hybrid load operates at the reduced voltage in case of a failure of the first battery string or the second battery string,
   wherein the nominal voltage is the total output voltage supplied by the first battery string and the second battery string,
   wherein the reduced voltage is the first operating voltage supplied by the first battery string or the second operating voltage supplied by the second battery string,
   wherein the hybrid load is a cooler configured to prevent thermal runaway in the first battery string and the second battery string by providing cooling to the first battery string and the second battery strings, and further configured to provide cooling to at least one other system,
   wherein, during operation at the reduced voltage, the cooler is configured to selectively operate routing of a coolant to maintain sufficient cooling of the first battery string and the second battery string, while reducing the cooling of the at least one other system.

2. The electrical distribution system of claim 1, wherein the hybrid load further comprises an ADAS.

3. The electrical distribution system of claim 1, wherein the first operating voltage is substantially equal to the second operating voltage.

4. The electrical distribution system of claim 1, wherein the total output voltage is equal to the sum of the first operating voltage and the second operating voltage.

5. The electrical distribution system of claim 1, wherein the total operating voltage is equal to the sum of the first operating voltage, the second operating voltage, and a third voltage corresponding to a third battery string.

6. The electrical distribution system of claim 1, wherein the electrical distribution system comprises a plurality of hybrid loads.

7. A method of operating an electrical system for a vehicle, the method comprising:

providing a first battery string having a first operating voltage;

providing a second battery string having a second operating voltage, the second battery string being electrically coupled in series to the first battery string to generate a total output voltage substantially equal to or greater than a sum of the first operating voltage and the second operating voltage; and providing a hybrid load configured to be operable at a nominal voltage and at a reduced voltage, wherein the hybrid load operates at the reduced voltage in case of a failure of the first battery string or the second battery string, wherein the nominal voltage is the total output voltage supplied by the first battery string and the second battery string, wherein the reduced voltage is the first operating voltage supplied by the first battery string or the second operating voltage supplied by the second battery string, wherein the hybrid load is a cooling system configured to prevent thermal runaway in the first battery string and the second battery string by providing cooling to the first battery string and the second battery string, and further configured to provide cooling to at least one other system, wherein, during operation at the reduced voltage, the method further comprises selectively routing a coolant to maintain sufficient cooling of the first battery string and the second battery string, while reducing the cooling of the at least one other system.

8. The method of claim 7, wherein the cooling system has a plurality of cooling pathways.

9. The method of claim 8, further comprising selectively coupling the first operating voltage, the second operating voltage, or the total operating voltage to the hybrid load.

10. The method of claim 9, wherein the coolant is selectively routed through the plurality of cooling pathways.

11. The method of claim 10, wherein the selective routing of the coolant comprises routing coolant adjacent to either the first battery string or the second battery string.

12. The method of claim 11, wherein the selective routing of the coolant is based upon a location of a detected thermal event in either of the first battery string or the second battery string.

13. A vehicle system comprising:
a battery system including:
a first battery string having a first operating voltage; and
a second battery string having a second operating voltage, the second battery string being electrically coupled in series to the first battery string to generate a total output voltage substantially equal to or greater than a sum of the first operating voltage and the second operating voltage; and a plurality of hybrid loads each configured to operate at a nominal voltage and at a reduced voltage, wherein at least one hybrid load of the plurality of hybrid loads operates at the reduced voltage in case of a failure of the first battery string or the second battery string, wherein the nominal voltage is the total output voltage supplied by the first battery string and second battery string, wherein the reduced voltage is the first operating voltage supplied by the first battery string or the second operating voltage supplied by the second battery string, wherein the at least one of the plurality of hybrid loads is a cooling system, the cooling system comprising a plurality of coolant tubes and a chiller, and wherein the chiller is a hybrid load, wherein the cooling system is configured to prevent thermal runaway in the first battery string and the second battery string by providing cooling to the first battery string and the second battery string, and further configured to provide cooling to at least one other system, wherein, during operation at the reduced voltage, the cooling system is configured to selectively operate routing of a coolant to maintain sufficient cooling of the first battery string and the second battery string, while reducing the cooling of the at least one other system.

14. The vehicle system of claim 13, wherein one of the plurality of hybrid loads is an ADAS.

15. The vehicle system of claim 13, wherein the first operating voltage is substantially equal to the second operating voltage.

16. The vehicle system of claim 13, wherein the total output voltage is equal to the sum of the first operating voltage and the second operating voltage.

17. The vehicle system of claim 13, wherein the total operating voltage is equal to the sum of the first operating voltage, the second operating voltage, and a third voltage corresponding to a third battery string.

18. The electrical distribution system of claim 1, wherein the first operating voltage is different from the second operating voltage.

* * * * *